United States Patent
Huffman et al.

(10) Patent No.: US 8,991,000 B2
(45) Date of Patent: Mar. 31, 2015

(54) LOW MOISTURE EXTRACTION DEEP CLEANING

(75) Inventors: Eric C. Huffman, Lowell, MI (US); Joseph P. Perry, Comstock Park, MI (US); Charles A. Reed, Jr., Rockford, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 901 days.

(21) Appl. No.: 12/958,701

(22) Filed: Dec. 2, 2010

(65) Prior Publication Data

US 2011/0132406 A1 Jun. 9, 2011

Related U.S. Application Data

(60) Provisional application No. 61/266,289, filed on Dec. 3, 2009.

(51) Int. Cl.
| | |
|---|---|
| A47L 11/34 | (2006.01) |
| A01K 13/00 | (2006.01) |
| A47L 11/40 | (2006.01) |
| A47L 11/38 | (2006.01) |

(52) U.S. Cl.
CPC ............... *A47L 11/34* (2013.01); *A47L 11/38* (2013.01); *A01K 13/001* (2013.01); *A47L 11/4036* (2013.01); *A47L 11/4083* (2013.01); *A47L 11/4088* (2013.01)
USPC .............................................. 15/320; 15/322

(58) Field of Classification Search
CPC .............................. A47L 11/302; A47L 11/38
USPC ................................................... 15/320, 322
IPC ............................................. A47L 11/20, 11/34
See application file for complete search history.

(56) References Cited

U.S. PATENT DOCUMENTS

| | | | |
|---|---|---|---|
| 3,181,190 A | 5/1965 | Dix et al. | |
| 3,616,482 A | 11/1971 | Brycki | |
| 3,720,977 A | 3/1973 | Brycki | |
| 4,073,030 A | 2/1978 | Albishausen | |
| 4,408,366 A | 10/1983 | Goldsmith | |
| 5,103,527 A | 4/1992 | Holland | |
| 5,105,503 A | 4/1992 | Holland | |
| 5,992,051 A | 11/1999 | Salehibakhsh | |
| 6,021,545 A | 2/2000 | Delgado et al. | |
| 6,131,237 A | 10/2000 | Kasper et al. | |
| 6,347,428 B1 | 2/2002 | Shimko et al. | |
| 7,578,025 B2 * | 8/2009 | Kostreba et al. ................. 15/321 |
| 7,725,985 B2 * | 6/2010 | Krebs .............................. 15/412 |
| 2001/0047562 A1 | 12/2001 | Lenkiewicz et al. | |
| 2002/0162187 A1 | 11/2002 | Keller | |
| 2006/0207052 A1 | 9/2006 | Tran | |
| 2008/0271272 A1 * | 11/2008 | Righetto ......................... 15/41.1 |
| 2010/0223750 A1 * | 9/2010 | Kappos et al. .................. 15/320 |

FOREIGN PATENT DOCUMENTS

| | | |
|---|---|---|
| CA | 1249906 A1 | 2/1989 |
| CN | 1620983 A | 6/2005 |
| GB | 1601455 | 10/1981 |
| GB | 2240467 A | 8/1991 |
| KR | 1020070078482 | 8/2007 |
| WO | 9003142 A1 | 4/1990 |
| WO | 03003897 A2 | 1/2003 |
| WO | 2009021103 A2 | 2/2009 |

\* cited by examiner

*Primary Examiner* — David Redding
(74) *Attorney, Agent, or Firm* — McGarry Bair PC

(57) ABSTRACT

An extractor has a plurality of fluid delivery needles mounted to a housing in fluid communication with a fluid distribution system and positioned to penetrate a carpet surface to deliver a cleaning solution below the surface of the carpet and into the carpet nap. Soiled cleaning fluid is removed from the surface with suction. A method of cleaning a carpet or a pet coat having a nap comprises injecting cleaning fluid, such as a foam detergent, directly into the nap and removing soiled cleaning fluid from the carpet.

13 Claims, 7 Drawing Sheets

LOW MOISTURE EXTRACTION DEEP CLEANING

CROSS-REFERENCE TO RELATED APPLICATION

This application claims the benefit of U.S. Provisional Patent Application No. 61/266,289 filed Dec. 3, 2009, which is incorporated herein by reference in its entirety.

BACKGROUND OF THE INVENTION

1. Field of the Invention

This invention relates to carpet extraction cleaning. In one of its aspects, the invention relates to a carpet extractor that delivers cleaning fluid deep into a carpet for deep cleaning of the carpet. In another of its aspects, the invention relates to a method for deep cleaning of carpets wherein cleaning fluid is injected directly into the carpet fibers. In another of its aspects, the invention relates to low moisture extraction cleaning of a carpeted surface.

2. Description of the Related Art

Extractors are well-known devices for deep cleaning carpets and other fabric surfaces, such as upholstery. Most carpet extractors comprise a fluid delivery system and a fluid recovery system. The fluid delivery system typically includes one or more fluid supply tanks for storing a supply of cleaning fluid, a fluid distributor for applying the cleaning fluid to the surface to be cleaned, and a fluid supply conduit for delivering the cleaning fluid from the fluid supply tank to the fluid distributor. The fluid recovery system usually comprises a recovery tank, a nozzle adjacent the surface to be cleaned and in fluid communication with the recovery tank through a working air conduit, and a source of suction in fluid communication with the working air conduit to draw the cleaning fluid from the surface to be cleaned and through the nozzle and the working air conduit to the recovery tank. An example of an extractor is disclosed in commonly assigned U.S. Pat. No. 6,131,237 to Kasper et al., which is incorporated herein by reference in its entirety. Typically, the fluid is deposited on the surface of the carpet and the carpet is agitated to enhance the cleaning process. Frequently, the carpet fibers and backing become saturated and thus have a long drying time. In addition, soiled fluid may not be removed from deep within the carpet fibers and from the backing.

SUMMARY OF THE INVENTION

According to the invention, a carpet extractor comprises a housing having a suction nozzle, a fluid distribution system associated with the housing and adapted to distribute a cleaning solution to a carpet to be cleaned, a fluid recovery system including the suction nozzle associated with the housing and adapted to remove soiled cleaning fluid from the carpet surface; and fluid delivery needles mounted to the housing in fluid communication with the fluid distribution system and positioned to penetrate the carpet surface. The needles have at least one outlet opening at a lower portion thereof for delivering the cleaning solution below the surface of the carpet and into the carpet nap.

In one embodiment, the needles are hollow and form a fluid distribution conduit between an inlet opening and the at least one outlet opening.

In another embodiment, an injection plate with fluid delivery needles is mounted to the housing. In one embodiment, the injection plate comprises a manifold having a plurality of apertures. Alternately, the injection plate can be a manifold having the needles integrally formed therein.

In another embodiment, an agitator is mounted to the housing. The agitator can be a fixed brush or a movable brush. In addition, the agitator can be mounted to the injection plate.

Preferably, the fluid delivery system is configured to deliver a detergent foam to the carpet through the fluid delivery needles.

The invention can be used with any type of carpet extractor, such as an upright deep cleaner, an above floor tool and a stationary spot cleaner.

Further according to the invention, a method of cleaning a carpet with a fabric nap comprises injecting cleaning fluid directly into the nap of the carpet, and removing soiled cleaning fluid from the carpet. In one embodiment, the nap of the carpet is agitated between the injection and removing steps. Preferably, the soiled cleaning fluid is removed from the carpet nap by suction. The method further can include collecting materials in the injected cleaning fluid. With this method, the cleaning fluid is injected beneath the surface of the carpet to be cleaned.

Preferably, the cleaning fluid is a detergent foam that remains suspended in the carpet fibers after application and does not saturate the carpet backing like traditional liquid detergents applied with pressurized nozzles or spray bars. Thus, by applying foam detergent down into the nap or fibers of the carpet, the entire carpet fiber can be cleaned from the bottom up while avoiding saturation of the carpet backing and realizing reduced carpet drying-time. The method thus results in a low moisture extraction process.

Further according to the invention, in addition to carpet and upholstery, a method of cleaning a domestic pet coat comprises injecting cleaning fluid directly into the fur of the pet and removing soiled cleaning fluid from the pet. In one embodiment, the pet coat is agitated between the injection and removing acts. Preferably, the soiled cleaning fluid is removed from the pet coat by suction. The method further can include collecting materials in the injected cleaning fluid.

BRIEF DESCRIPTION OF THE DRAWINGS

The invention will now be described with respect to the drawings in which.

DESCRIPTION OF EMBODIMENTS OF THE INVENTION

Figure 1:
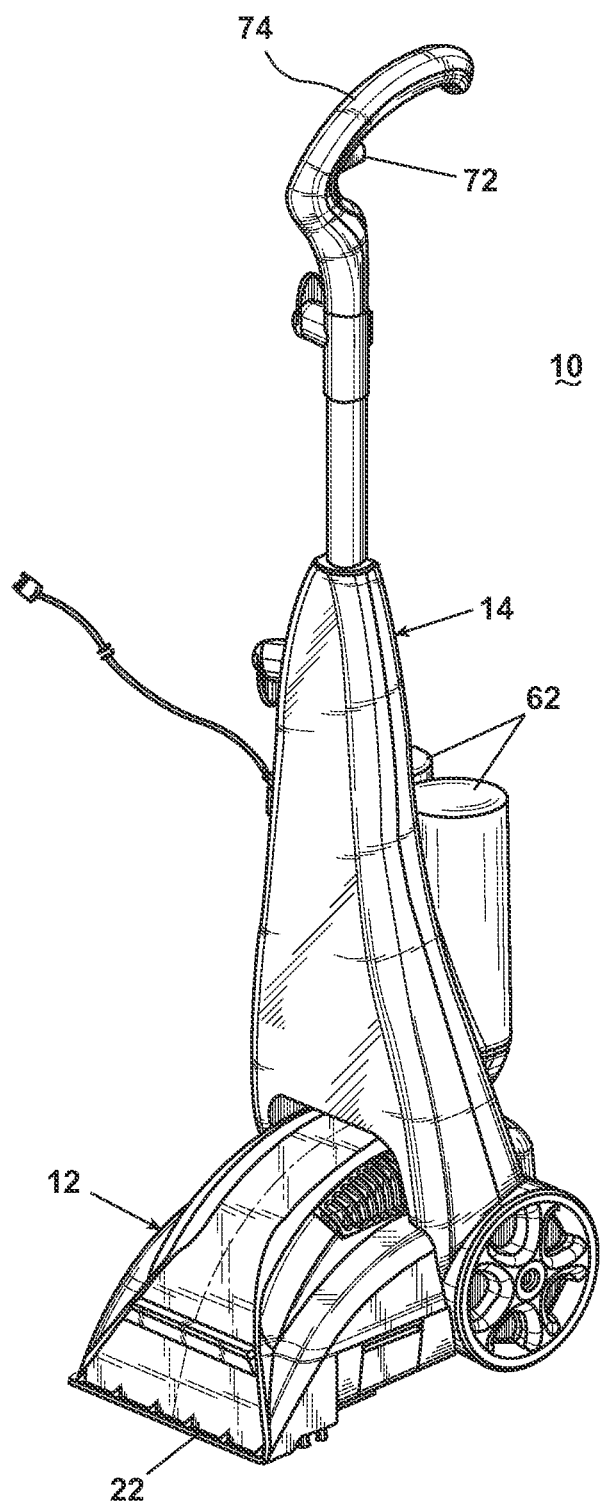
FIG. 1 shows an exemplary extraction cleaner according a first embodiment of the invention.

An upright extractor 10 with an injection plate 16 according to the invention is shown in FIG. 1. A suitable extractor is shown in more detail in U.S. Pat. No. 6,658,692, and U.S. Pat. No. 6,131,237, both of which are incorporated herein by reference in their entirety. In one embodiment, the extractor 10 comprises a foot assembly 12 for movement across a surface to be cleaned and a handle assembly 14 pivotally mounted to a rearward portion of the foot assembly 12 for directing the foot assembly 12 across the surface to be cleaned. The extractor 10 comprises a fluid delivery system for storing cleaning fluid and delivering the cleaning fluid to the surface to be cleaned and a fluid recovery system for removing the spent cleaning fluid and dirt from the surface to be cleaned and storing the spent cleaning fluid and dirt. The components of the fluid delivery system and the fluid recovery system are supported by at least one of the foot assembly 12 and the handle assembly 14.

Figure 2:
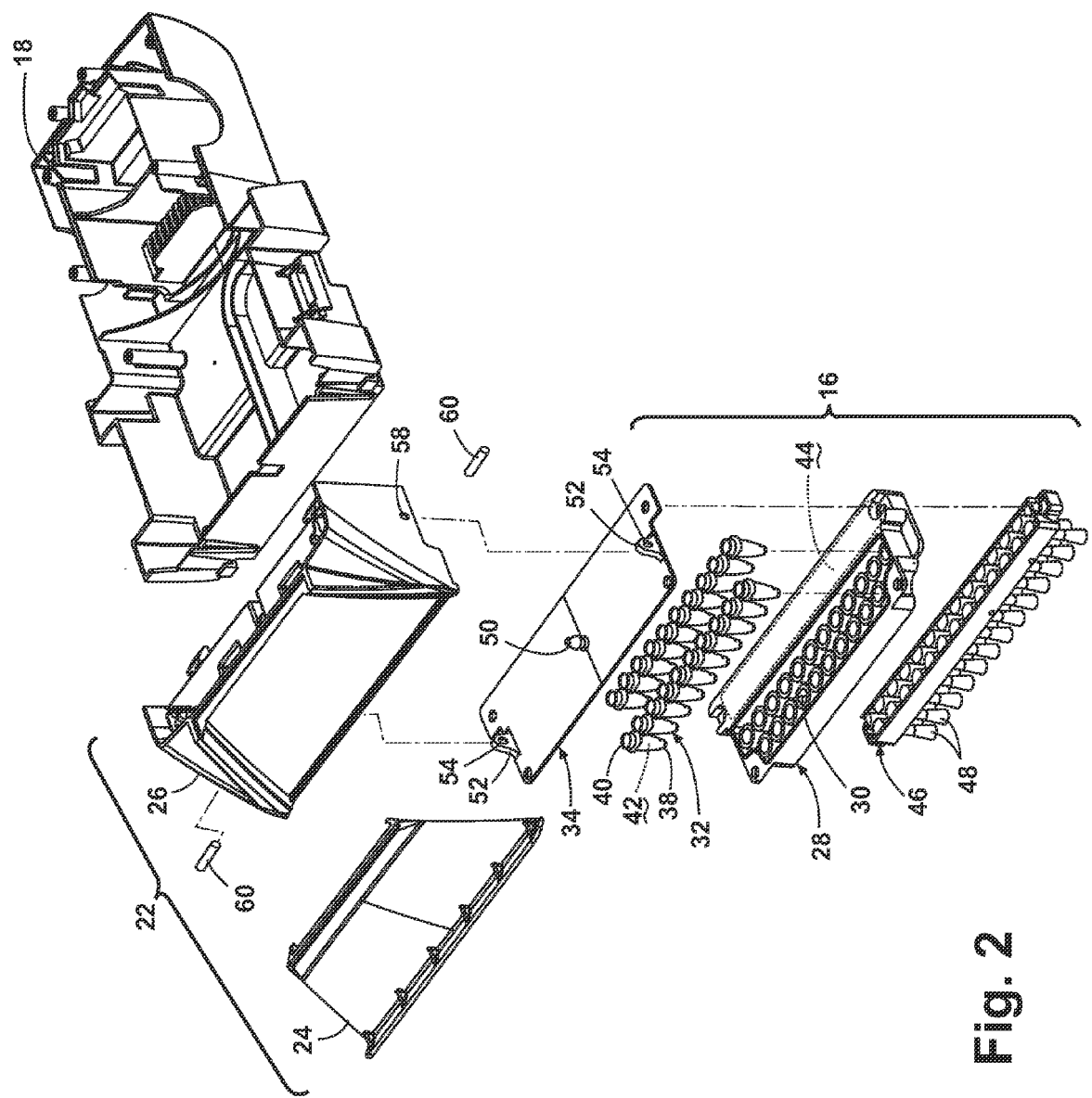
FIG. 2 is an exploded view of a portion of a foot assembly of the extractor shown in FIG. 1.
Figure 3:
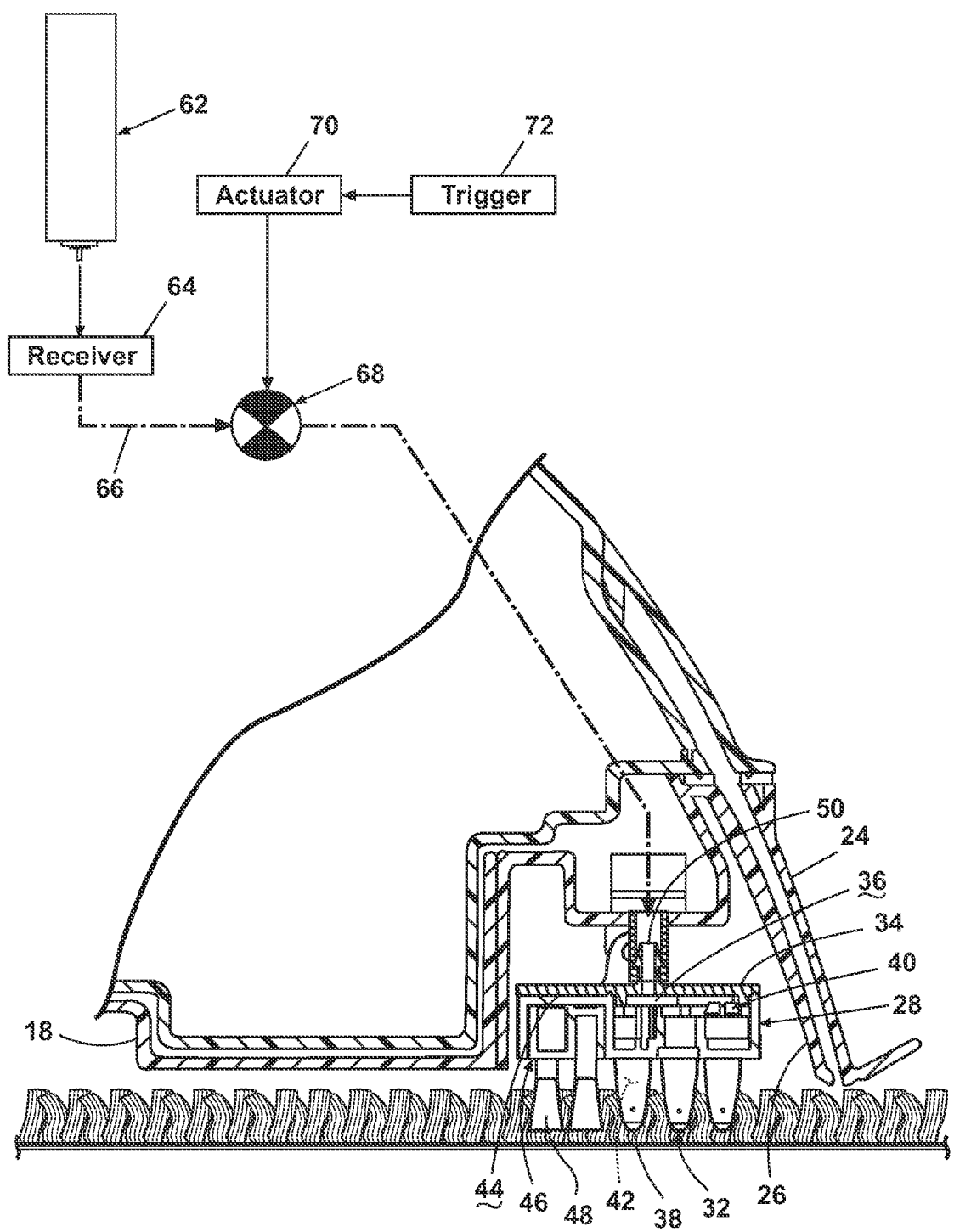
FIG. 3 is a partial cross-sectional view of the foot assembly shown in FIG. 2.

Referring to FIGS. 2 and 3, the foot assembly 12 comprises a base housing 18 and a nozzle assembly 22. The nozzle assembly 22 comprises a suction nozzle 24, and a nozzle housing 26, in which an injection plate 16 is pivotally mounted.

The injection plate 16 comprises a generally rectangular manifold 28 having a plurality of apertures 30 in which a plurality of fluid delivery needles 32 is mounted. The injection plate 16 further comprises a manifold cover 34 that includes a manifold inlet 50. The manifold 28 and manifold cover 34 together define a channel 36 that forms a portion of the fluid distribution system. The injection plate 16 comprises a single inlet 50 and a plurality of outlets, defined by apertures 30, spaced along its length. The manifold inlet 50 is fluidly connected to the fluid distribution system.

In the illustrated embodiment, the fluid delivery needles 32 comprise a hollow cone shaped member having a fluid delivery needle outlet 38 in the tip for delivering fluid or foam deep into the carpet nap. Although not shown, it is also contemplated that the needles 32 include a plurality of outlets along the length of the needle 32 and orthogonal to the longitudinal axis of the needle 32 for delivering fluid or foam along the entire depth of the carpet nap. Further, alternative geometries, for example, pyramid-like, or v-shaped ramped rake structures similar to those disclosed in published PCT application No. WO 2009/021103, which is incorporated herein by reference in its entirety, are feasible needle 32 geometries. The needles can be made of any suitable rigid material, including stainless steel, aluminum and alloys thereof, thermoplastic and thermosetting material. In addition, the needles can be made of semi-rigid material such as elastomeric materials. Still further, the needles 32 or alternative geometries can be arranged in a single row spanning the longitudinal axis of the manifold 28, or multiple, staggered rows. The needle 32 also has a needle inlet 40 in the proximal end opposite the tip. The needle inlet 40 is in fluid communication with the channel 36 and the fluid distribution system and each needle 32 further comprises a fluid distribution conduit 42 formed therein. Further, the needles 32 are mounted in the manifold 28 apertures 30 by any suitable means, such as a threaded screw fastener, snap, heat staking, ultrasonic welding, adhesive, or any other suitable form of welding or gluing. Alternatively, the needles 32 can be made of a thermoplastic material and integrally formed with the manifold 28.

The manifold 28 also comprises a brush cavity 44 in which a brush 46 can be mounted. The brush 46 comprises a plurality of bristle tufts 48, as is commonly known in the art. The brush 46 can be mounted in the manifold 28 brush cavity 44 by any suitable means, such as a snap fit, or heat staking, ultrasonic welding, adhesive, or any other suitable form of welding or gluing. In the embodiment illustrated, the brush 46 is shown located in the rear portion of the injection plate 16. Alternatively, the brush 46 can be located in the forward portion of the injection plate 16, or two brushes 46 can be located in both the forward and rear portions of the injection plate 16, with the needles 32 located in between the brushes 46.

The injection plate 16 is pivotally mounted within the nozzle housing 26. Pivotally mounting the injection plate 16 within the nozzle housing 26 can be accomplished in any number of known ways. The embodiment illustrated shows one exemplary method of pivotally mounting the injection plate 16 to the nozzle housing 26. This mounting method comprises a pair of ears 52 formed in the manifold 28; the ears 52 each having a pin hole 54. The nozzle housing includes corresponding mounting blocks (not shown) that each also have a pin hole 58 therethrough. In conventional fashion, the injection plate 16 is aligned with the nozzle housing 26 and a pin 60 is inserted through the pin holes 54, 58 to pivotally connect the injection plate 16 to the nozzle housing 26. Other methods of pivotally mounting the injection plate 16 to the nozzle housing 26 are feasible. With the injection plate 16 installed in the nozzle housing 26, the needles 32 protrude below the lower surface of the nozzle housing 26 and suction nozzle 24.

The extractor is preferably configured to deliver a detergent foam. In one embodiment, the foam is supplied to the injector plate 16 from a pressurized container 62 that is adapted to deliver a foam detergent. One or more pressurized containers 62 are removably connected to a receiver 64 on the rear portion of the handle assembly 14. The receiver 64 comprises conventional retention features (not shown) such as snaps, latches, or threads that secure the container 62 to the receiver 64 during use. The receiver 64 further comprises one or more valve stem actuators (not shown) for engaging a conventional valve stem on the container 62. The valve stem actuator is connected to a fluid delivery conduit 66 that fluidly connects the container 62 to the fluid delivery system when the container 62 is loaded and secured to the receiver 64. A flow control valve 68 mounted within the fluid delivery conduit 66 is operably connected to an actuator 70 that selectively opens and closes the valve 68 to permit detergent foam to flow therethrough. The actuator 70 can comprise a conventional mechanical actuator such as a push rod, or a conventional electric actuator such as a micro-switch depending on whether a conventional mechanical valve or electro-mechanical solenoid valve is used. The actuator 70 is operably connected to a trigger 72 mounted within a handle grip 74 on the upper portion of the handle assembly 14. The trigger 72 is adapted to pivot within the handle grip 74 to selectively engage the actuator 70 when the trigger is depressed by a user. The actuator 70, in turn, is configured to selectively open the normally closed flow control valve 68 either mechanically or electrically.

Pressurized aerosol cans that are filled with detergent or other topical treatments such as anti-stain, anti-soil, miticide, or peroxide compositions, and adapted to dispense foam are well known in the art and are also suitable.

In operation, the extractor 10 is prepared for use by loading one or more pressurized aerosol containers 62 into the receiver 64. The container(s) 62 are secured to the receiver 64 by commonly known aerosol retention features (not shown). A valve stem actuator engages the valve stem of each container 62 thereby permitting the contents to flow into the fluid delivery conduit 66. A user then grasps the handle grip 74 and maneuvers the extractor 10 back and forth across the carpeted surface while selectively depressing the trigger 72. The trigger 72 engages the actuator 70, which, in turn, opens the normally closed flow control valve 68 within the fluid delivery conduit 66. When the valve 68 is opened, cleaning solution, in the form of either foam or liquid, is provided to the carpet via the fluid distribution system through the injection plate 16. The fluid recovery system applies suction through the nozzle 24 to extract the dirty solution from the surface to be cleaned. Examples of suitable fluid distribution and recovery systems can be found in U.S. Pat. No. 6,658,692 and U.S. Pat. No. 6,131,237, as referenced above.

During use, as the extractor 10 moves forward the injection plate 16 is biased in a rearward direction, thereby placing the needles 32 at a rearward angle so they penetrate the carpet nap without inhibiting the forward motion of the extractor 10 or increasing the force required by the user to push or pull the extractor 10 across the carpet. The brush 46 is also biased in a rearward direction but still contacts the carpet surface. When the extractor 10 moves backward, the injection plate 16 is biased in a forward direction, thereby placing the needles 32 in a forward tilt.

The described extractor 10 having an injection plate 16 with needles 32 on the lower surface is configured to distribute cleaning solution into the nap of the carpet. The fluid distribution system supplies cleaning solution to the manifold inlet 50. The cleaning solution then passes through the channel 36 and into the plurality of needles 32, through each needle inlet 40 and fluid distribution conduit 42. The cleaning solution is then distributed to the carpet through each needle outlet 38. The brush 46 agitates the surface of the carpet to aid in the cleaning. When the cleaning fluid is in the carpet, it loosens dirt and debris material that is embedded in the carpet. This process is enhanced by the brushes 46 that agitate the surface. To this end, the agitator can comprise a rotary brush as disclosed, for example, in the incorporated U.S. Pat. No. 6,131,237, or the fixed brush 46 disclosed above.

This method provides the deposition of cleaning solution down into the depth of the carpet nap, not just on the upper surface of the carpet. The needles 32 penetrate the carpet nap and extend near the carpet backing, thus separating the carpet fibers so that the cleaning solution can flow deep down into the carpet fibers. When detergent foam is used, the cleaning solution remains suspended in the carpet fibers after application until removed by suction and does not saturate the carpet backing like traditional methods of applying cleaning solution via pressurized nozzles or spray bars. This method enables the entire depth of the carpet fiber to be cleaned from the bottom up while avoiding saturation of the carpet backing and realizing reduced carpet drying time.

Figure 4:
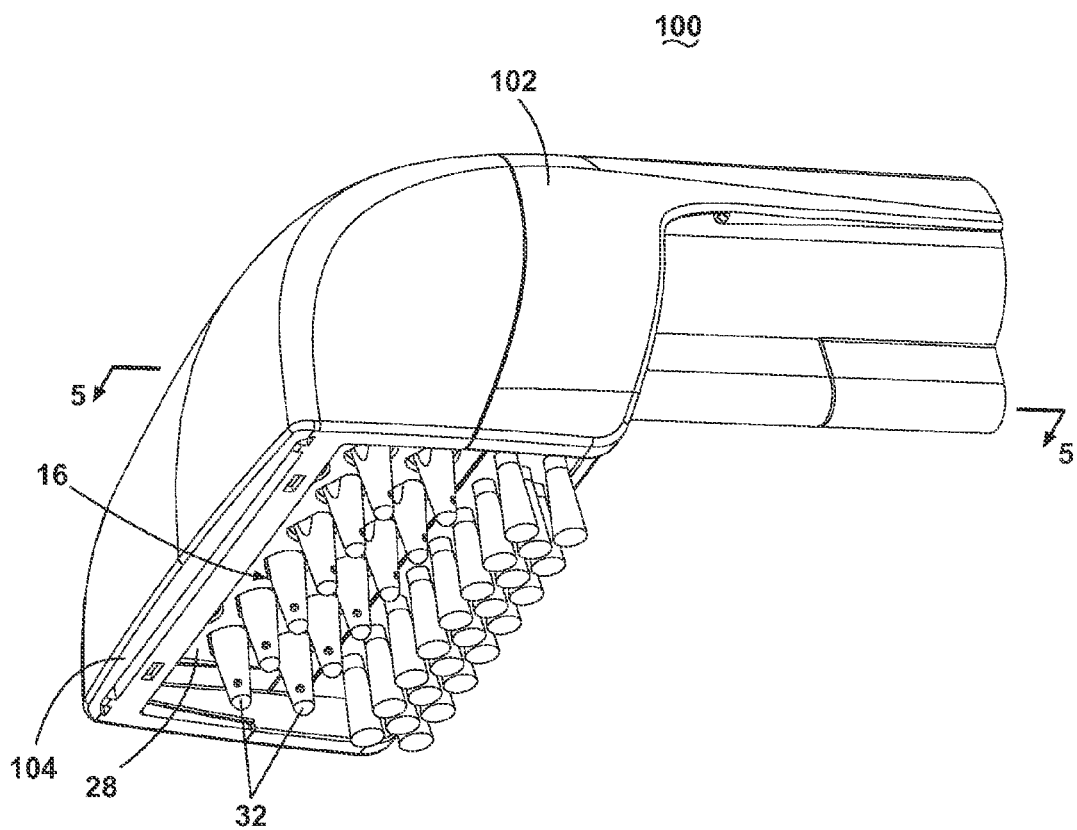
FIG. 4 is an exemplary accessory tool according to a second embodiment of the invention.
Figure 5:
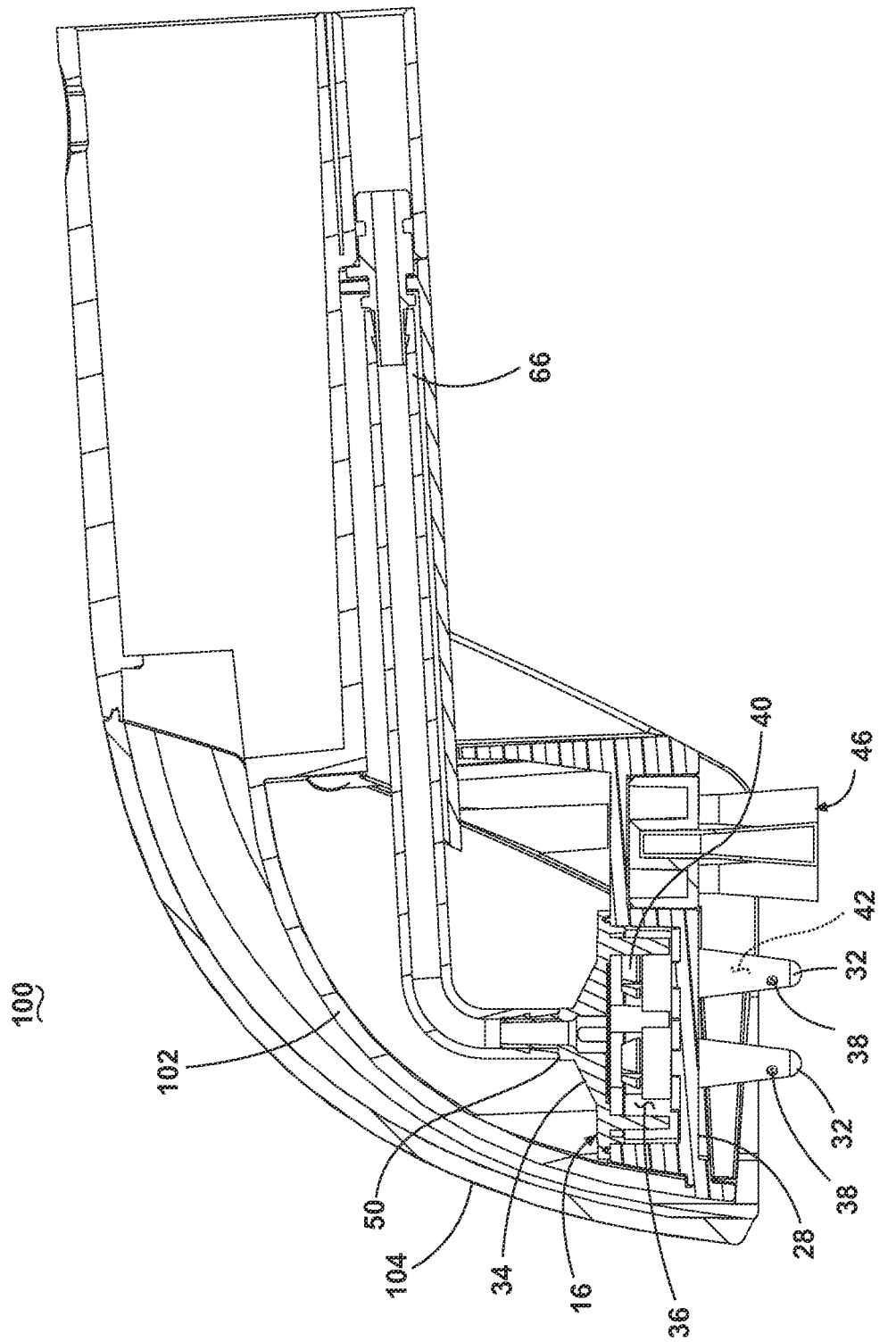
FIG. 5 is a cross-sectional view, taken along line 5-5, of the accessory tool shown in FIG. 4.

Referring to FIGS. 4-5, a second embodiment of the invention is illustrated in which similar elements from the first embodiment are labeled with the same reference numerals. An exemplary extractor accessory tool 100 comprises a housing 102 and a suction nozzle 104 adapted for connection to a source of suction, such as a conventional suction hose (not shown). The injection plate 16 is mounted in the housing 102 and a plurality of fluid delivery needles 32 are mounted in the injection plate 16, as described above. The injection plate 16 and needles 32 are positioned within the housing 102 so that the needles 32 extend below the housing 102 and suction nozzle 104. As illustrated in FIG. 5, the needle outlets 38 are positioned orthogonal to the longitudinal axis of the needles 32. As described above with reference to the first embodiment, the injection plate 16 comprises the manifold 28, manifold cover 34, and manifold inlet 50 that together form a portion of the fluid distribution system and fluidly connect the accessory tool 100 to the fluid distribution system. As shown in the illustration, a brush 46 can also be included in the accessory tool 100.

In operation of the extractor accessory tool 100, the user grasps the housing 102 and maneuvers the accessory tool 100 back and forth across the carpeted surface. Cleaning solution, in the form of either foam or liquid, is provided to the carpet via the above described fluid distribution system through the injection plate 16. The fluid recovery system applies suction through the nozzle 104 to extract the dirty solution from the surface to be cleaned. The described extractor accessory tool 100 comprises an injection plate 16 with needles 32 on the lower surface configured to distribute cleaning solution into the nap of the carpet. The fluid distribution system supplies cleaning solution to the manifold inlet 50. The cleaning solution then passes through the channel 36 and into the plurality of needles 32, through each needle inlet 40 and fluid distribution conduit 42. The cleaning solution is then distributed to the carpet out of the side of the needles 32 through each needle outlet 38 for delivering the cleaning solution below the surface and into a fibrous nap. The brush 46 agitates the surface of the carpet to aid in the cleaning. When the cleaning fluid is in the carpet, it loosens dirt and debris material that is embedded in the carpet. This process is enhanced by the brushes 46 that agitate the surface.

Alternatively, in addition to carpet and upholstery, the accessory tool 100 can be used to wash the coat of a domestic pet, such as a dog or cat. The cleaning fluid or foam can be formulated to clean a pet's coat. The cleaning fluid or foam is applied deep into the pet's fur via the injection needle outlets 38 and manually agitated by the brush 46 as the user moves the tool 100 back and forth across the pet's coat. The cleaning fluid or foam loosens dirt, debris, and dander embedded in the fur, which is then extracted through the nozzle 104.

Figure 6:
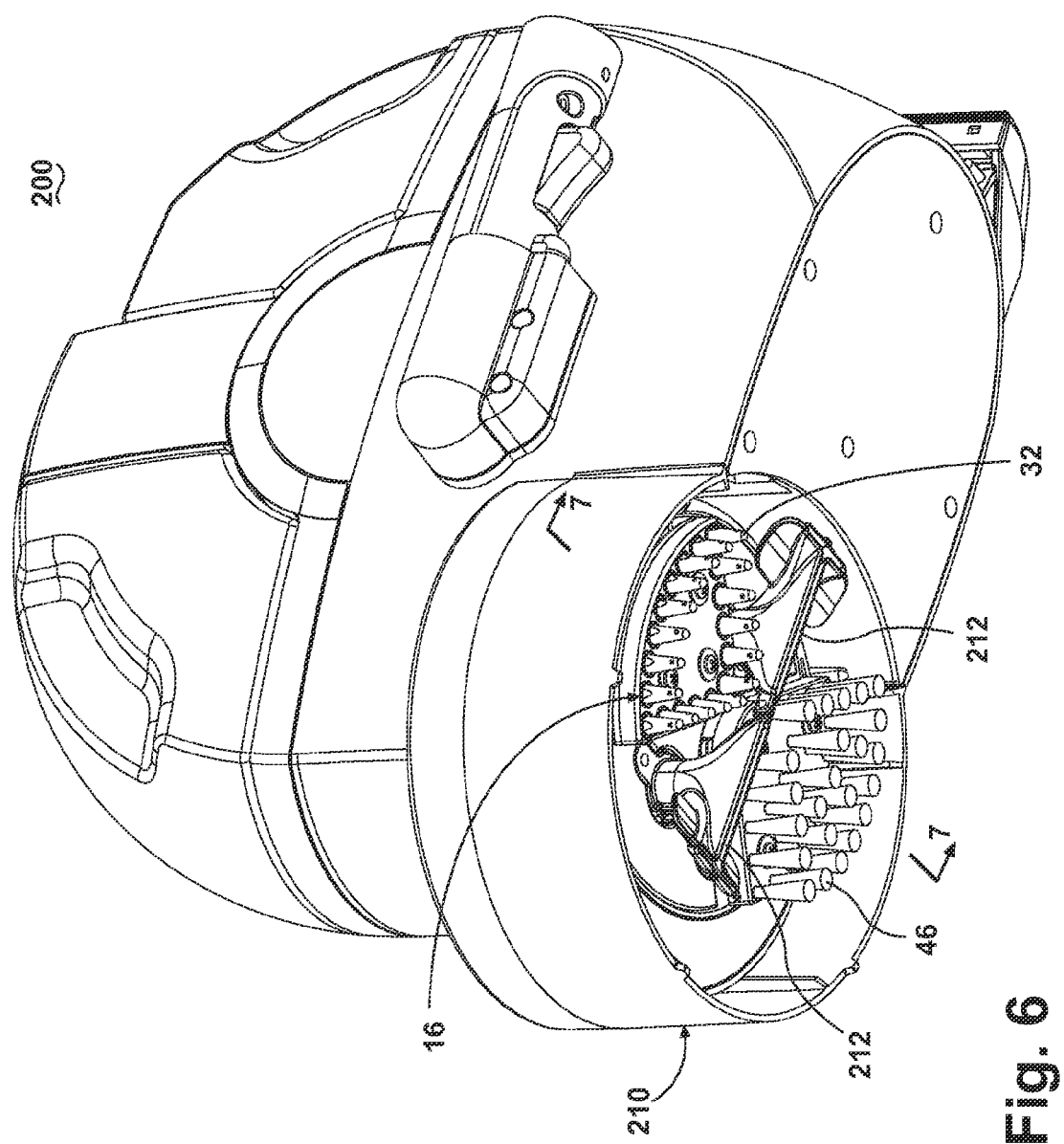
FIG. 6 is an exemplary spot cleaning apparatus according to a third embodiment of the invention.
Figure 7:
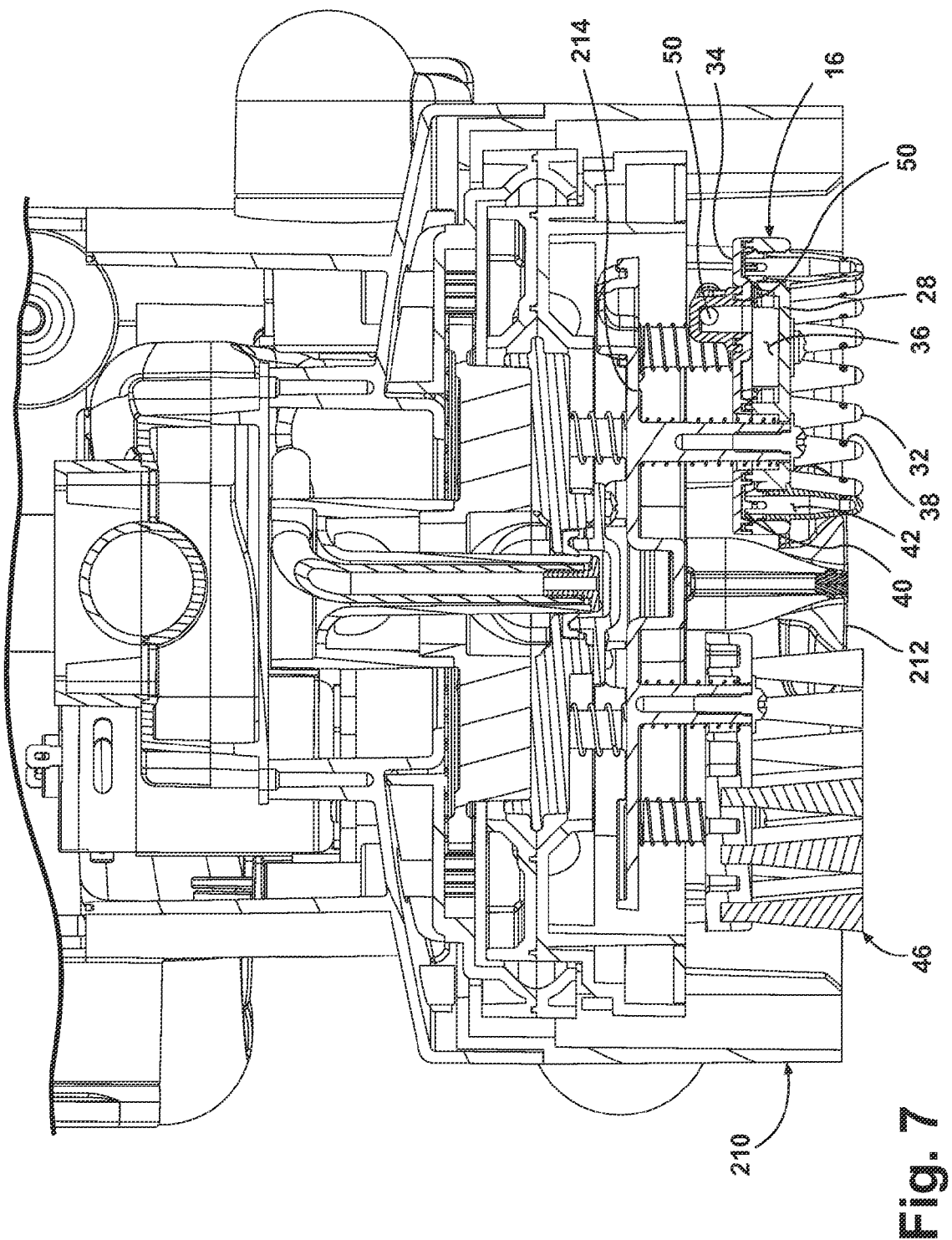
FIG. 7 is a cross-sectional view, taken along line 7-7, of the spot cleaning apparatus shown in FIG. 6.

An exemplary spot cleaning apparatus 200 with the injection plate 16 is shown in FIGS. 6-7, according to a third embodiment of the invention where like elements from the first embodiment are labeled with the same reference numerals. A suitable spot cleaning apparatus is shown in more detail in U.S. Pat. No. 7,234,197, which is incorporated herein by reference in its entirety. In one embodiment, the spot cleaning apparatus 200 comprises a carriage assembly 210 having a plurality of brushes 46, at least one suction nozzle assembly 212, and the injection plate 16. The injection plate 16 is mounted to a support plate 214 located in the carriage assembly 210, and a plurality of fluid delivery needles 32 are mounted in the injection plate 16, as described above. The injection plate 16 and needles 32 are positioned within the carriage assembly 210 so that the needles 32 extend below the carriage assembly 210. The needle outlets 38 are positioned orthogonal to the longitudinal axis of the needles 32. As described above with reference to the first embodiment, the injection plate 16 comprises the manifold 28, manifold cover 34, and manifold inlet 50 that together form a portion of the spot cleaning apparatus 200 fluid distribution system. In operation of the spot cleaning apparatus 200, the carriage assembly 210 is driven by a motor (not shown) to rotate the brushes 46, suction nozzle assemblies 212, and the injection plate 16 about a vertical axis, preferably in an elliptical orbit. Cleaning solution is applied to the carpet through the needles 32 as described above as the needles rotate about the axis, and the brushes 46 agitate the surface. The fluid recovery system applies suction through the suction nozzle assembly 212 to extract the dirty solution from the surface to be cleaned.

It will be understood that the disclosed embodiments are representative of preferred forms of the invention, but, are intended to be illustrative rather than definitive of the invention. The illustrated upright extractor is but one example of the variety of deep cleaners with which this invention or some slight variant can be used. Reasonable variation and modification are possible within the forgoing disclosure and drawings without departing from the scope of the invention which is defined by the appended claims.

What is claimed is:

1. An extractor comprising:
   a housing having a suction nozzle;
   a fluid distribution system associated with the housing and adapted to distribute a cleaning solution to a surface to be cleaned;
   a fluid recovery system including the suction nozzle associated with the housing and adapted to remove soiled cleaning fluid from the surface; and
   a plurality of fluid delivery needles mounted to the housing in fluid communication with the fluid distribution system and positioned to penetrate the fibers of the surface, the needles having at least one outlet opening orthogonal to the longitudinal axis of the needles at a lower portion thereof for delivering the cleaning solution below the surface and into a fibrous nap.

2. The extractor according to claim 1 wherein the needles are hollow and form a fluid distribution conduit between an inlet opening and the at least one outlet opening.

3. The extractor according to claim 2 and further comprising an injection plate mounted to the housing and mounting the fluid delivery needles.

4. The extractor according to claim 3 and further comprising an agitator mounted to the housing.

5. The extractor according to claim 4 wherein the agitator is mounted to the injection plate.

6. The extractor according to claim 3 wherein the injection plate comprises a manifold having a plurality of apertures in which the needles are mounted.

7. The extractor according to claim 3 wherein the injection plate comprises a manifold having the plurality of needles integrally formed in the manifold.

8. The extractor according to claim 1 and further comprising an agitator mounted to the housing and adapted to agitate the surface to be cleaned.

9. The extractor according to claim 8 wherein the agitator is a brush.

10. The extractor according to claim 1 wherein the extractor is an upright deep cleaner.

11. The extractor according to claim 1 wherein the extractor is an above floor tool for use with an upright deep cleaner.

12. The extractor according to claim 1 wherein the extractor is a spot cleaner that has a housing that is adapted to sit on the surface to be cleaned and in which the suction nozzle and plurality of needles are mounted to the housing for movement with respect to the housing and the surface to be cleaned.

13. The extractor according to claim 4 wherein the fluid delivery system is configured to deliver a detergent foam to the fibrous nap through the fluid delivery needles.

\* \* \* \* \*